United States Patent Office.

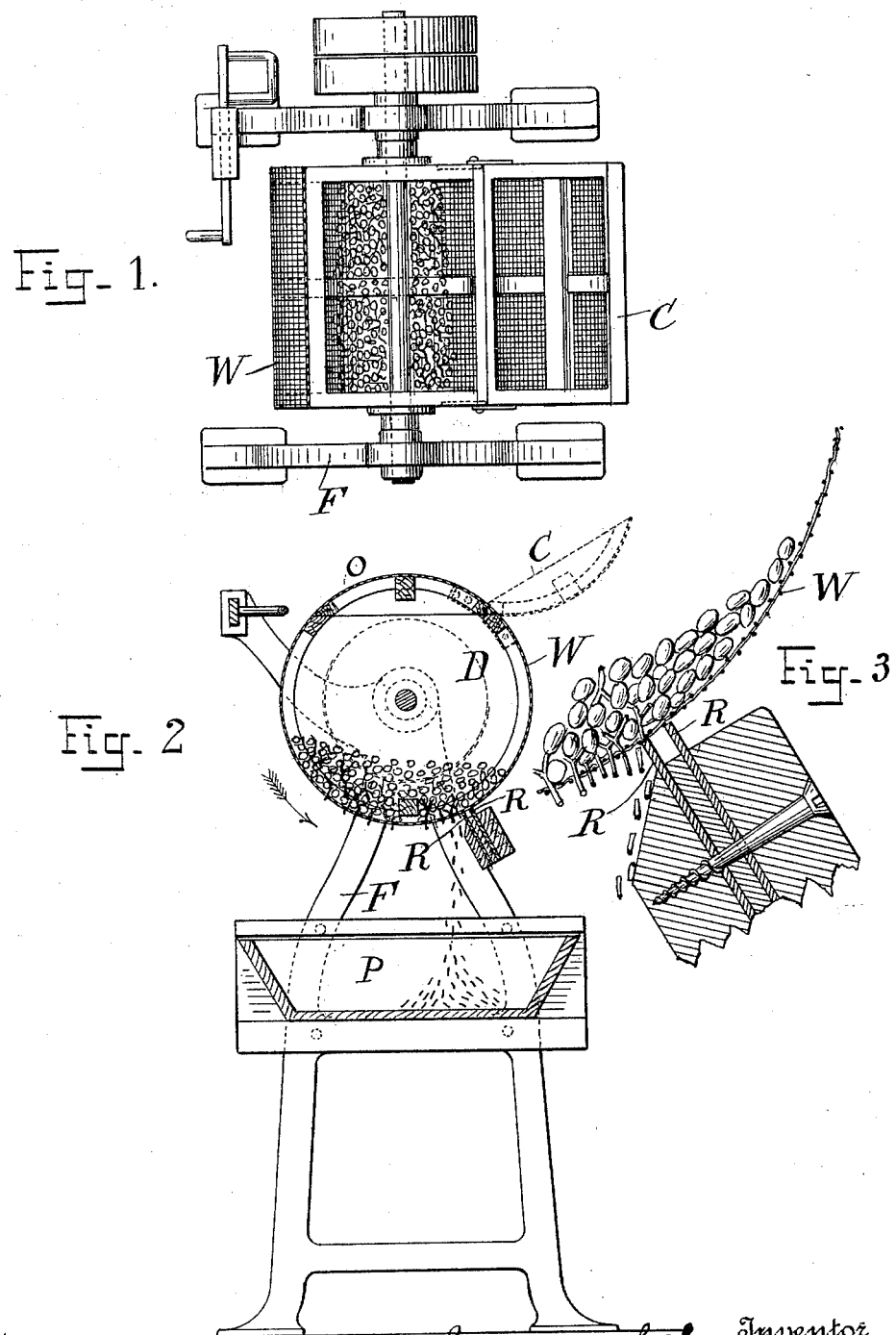

HERMANN L. SANBORN, OF PLEASANTVILLE, NEW YORK, ASSIGNOR, BY MESNE ASSIGNMENTS, TO THE SANITAS DRIED FRUIT COMPANY OF NEW YORK, OF NEW YORK.

RAISIN STEMMING AND PREPARING MACHINE.

SPECIFICATION forming part of Letters Patent No. 600,554, dated March 15, 1898.

Application filed January 18, 1895. Serial No. 535,322. (No model.)

*To all whom it may concern:*

Be it known that I, HERMANN L. SANBORN, a citizen of the United States, residing in the town of Pleasantville, county of Westchester, and State of New York, have invented a new and useful Raisin Stemming and Preparing Machine, of which the following is a specification.

My invention relates to a device for stemming and also for cleaning, disinfecting, renovating, rolling, striking, pressing, and rubbing raisins in mass or quantity; and the nature of the invention is indicated in the claims hereto annexed.

It has heretofore been the practice to send the larger part of the annual raisin crop—all except those sent in bunches—to market with the small or pedicel stem still in place or attached to the raisin, as during growth, and also with most if not all of the accumulated dirt, insect eggs, germs, &c., taken on during the period of growth in the vineyard still adhering to the raisin and to the pedicel-stem. Many of the germs are minute and disclose themselves and their places of concealment only to the most thorough and careful examination. The consequences have been that all such raisins have been found more or less infected, unsterilized, and therefore objectionable and even dangerous as food, and that inevitably during subjection to warm air worms and other forms of life would be developed, some of which would become sufficiently numerous and active to destroy, infect, and render useless for food vast quantities of raisins. Other kinds of dried fruits are similarly infected and injured, even when the pedicel-stem is removed, the objectionable matters being found and left attached to the skin of the fruit ready to develop under favoring conditions; and for well-known reasons it has been thought necessary to leave the pedicel-stems still attached to raisins when marketed. I have discovered the sources of these injuries and injurious conditions so destructive of the fruit when kept in store awaiting a market and also the means and process whereby the causes of injury may be removed and the fruit may be preserved for a much longer if not indefinite period of time in safety.

I am aware that it has been customary to tumble raisins, prunes, currants, and other dried fruits for the purpose of cleaning them after they have become infected and injured and for the purpose of removing worms and other forms of active life with their droppings; but my invention relates to prevention of all such injuries to raisins and other dried fruit by removing the eggs and germs of such kinds of life in advance, before the period of activity and development has arrived and before the injury has begun to take place, or while the raisins are new, fresh, or sound and while the parasitic life upon or about the fruit is still dormant and as yet unrecognized. The treatment received by the fruit is in the nature of a mechanical sterilizing and preservative process; and the dried fruit so treated I have discovered to be an improved product capable of being kept over more than the usual length of time in perfect safety.

The immediate practical objects of my invention are, first, to remove the short pedicel-stem or that part of the stem that usually remains immediately attached to each raisin even after it has been stripped or separated from the main stem of the bunch of which it formed a part during the period of growth; second, to remove with this pedicel-stem the insect eggs, germs, and other forms of life and infection that are deposited thereon or attached thereto; third, after preparing the way by removing the pedicel-stem subsequently to remove from the end of the raisin proper similar objectionable matters and things located on, at, or about the point of union or attachment between the pedicel-stem and the raisin; fourth, to knead and soften the raisin and its pulp within the skin and give the raisin a more rounded and natural form, both of these in preparation for the further process and operation of removing the seeds from such raisins as may have developed seeds by a rolling process when such seeding may be desired, this to be accomplished by tumbling the raisins in mass and upon one another; fifth, to remove the dirt, dust, and other objectionable objects and matters from other parts of the raisins, and, sixth, to brighten and polish such other parts of the raisins. All of these objects and methods except, perhaps, the fourth apply equally to raisins containing seeds and to "Sultana" raisins—those in which no seeds are developed—and may be made a part or parts of the general object and method of curing and preparing raisins for the market either by the producers or by the middlemen.

I attain the objects of my invention by the mechanism illustrated in the accompanying drawings, in which—

Figure 1 is a top view; Fig. 2, a transverse vertical sectional view, and Fig. 3 an enlarged detail view showing one feature of the stemming action of the apparatus.

Similar letters represent similar parts throughout the invention.

D is a revolving barrel or tumbler, the peripheral surface of which is preferably composed of No. 4 or 4½ wire-cloth and is provided with an opening, one way of constructing which is shown at O, intended to be opened and closed by the cover C, and through which the raisins or berries are passed into the barrel or drum to be treated, and after treatment are removed. The opening O may be made and the cover C may be constructed and secured in any other suitable way, so as to retain the raisins during the operation and permit access to the interior of the barrel or tumbler D. The tumber is supported in a frame F, so as to be capable of being revolved on or by a shaft or bearing. The scrapers or blades R R are secured in place and held in such relations to and across the wire-cloth W and the other surface of the tumbler as to engage and, being fixed, to hold and remove from attachment to the raisins the stems that may project through the wire circumference of the tumbler as it revolves, as shown in Fig. 3.

As shown, the scrapers or grippers R R consist of two strips of suitable material long enough to extend across the whole face of the tumbler. These strips are secured and held between strips of wood of at least equal length, but project on the side toward the tumbler beyond the securing-strips of wood, say, a half-inch, more or less. The gripper-strips R R are preferably composed of some suitably-yielding material, like rubber or rubber cloth, that will engage the projecting stems and hold them with some tenacity. I do not, however, limit my invention in this respect to any particular material, as a great variety of materials may be used in their construction. They should be so placed that their adjacent edges continuously almost, if not quite, touch the outer surface of the tumbler as it revolves, and preferably they should not scrape it. As they wear at the edges by use they may be readjusted to maintain proper relations with the tumbler, being held between the strips of wood by screws, as shown, or they may be made adjustable in any other suitable way.

Brushes have been used to operate upon the circumference of a tumbler or cylinder for tumbling dried fruit to clean both the inside and outside of tumblers that are provided with open or perforated surfaces in order to keep open or free from accumulations the perforations and even to push stems, sticky dirt, and other foreign matter through the perforations to the outside of the cylinder at its top to be brushed off by another brush or brushes located three-fourths of the circumference beyond in order to keep the spaces open and prevent any sticky matter being carried farther by the cylinder. My grippers have none of these purposes and perform no such functions. They are not intended to operate upon the cylinder or tumbler itself nor upon its perforations, but only upon the contents of the cylinder, and particularly upon that portion of the fruit that projects its stems beyond the surface of the cylinder. In other words, the brushes referred to operate only upon the cylinder and its accretions and in no way whatever upon the fruit being treated, while my grippers operate solely upon the fruit and its pedicel-stems for the purpose of separating them.

When engaged by the rubber scraper and held, the stem is either pulled off from the raisin, with its load of dirt and germ life, or by the rolling of the raisins in mass the raisin is pulled off from the stem, whereupon the stem drops outside the tumbler. While this circumference or periphery W of the tumbler is preferably made of wire-cloth having meshes sufficiently small to prevent the escape of the raisins and sufficiently large to permit the stems of the raisins to pass through and project beyond such surface, any other suitable material or circumferential surface that will operate in the same way may be substituted therefor without avoiding my invention.

The operation of the machine is substantially as follows: Taking the raisins from the boxes or packages as they are sold in the market, with many of the short stems still in place or attached thereto, the surfaces and stems of the raisins being usually more or less covered with dust, dirt, eggs of insects, germs of all kinds, and other forms of organized life, they are passed into the tumbler through the opening O or under the secured cover C, and the tumbler is then revolved with the opening so closed and secured at sufficient speed to cause the mass of raisins to continually roll or tumble and rub upon each other, but not fast enough to cause them to hang in one position by centrifugal action and revolve with the tumbler and without motion in relation to each other or to the tumbler, say, at about the speed of sixty revolutions per minute in case the tumbler is about twenty-four inches in diameter. As the raisins roll upon one another their surfaces are rubbed and the dirt, eggs, germs, and other foreign substances are thereby displaced and by the continued revolution caused to drop out of the tumbler through the wire-cloth circumference of the same. The raisins that still have the stems remaining and but slightly attached thereto will at the same time have them knocked off during the tumbling, or the raisins will be caught in the mass and caused to turn over while the stems are engaged, caught, or held between other adjacent raisins, and the stems will be broken or twisted off and thereby removed from the raisins. Some of the stems, and particularly those too tenaciously held to be thus removed, will eventually be automatically presented to and projected through the meshes of the wire-cloth or other perforated, meshed, foraminous, or open surface, so that when the body of the raisin is moved with the adjacent mass of raisins and turned over the stem will be actually held, bent, and broken off. On being removed from the raisins, or later on, the stems, dirt, eggs, germs, &c., will drop out of the tumbler through the meshes or openings or fall into a receptacle P, placed to receive them. In still other cases the raisins will be automatically caught and held in position by the stems projecting into the meshes until that portion of the stem which projects beyond the surface of the tumbler is engaged by the scrapers and thereby pulled or otherwise removed from the raisin and from the machine, as shown in Fig. 3 particularly. Tumbling alone will remove some of the pedicels—those most lightly attached—when the raisins are old and very dry, but not all of them, nor enough of them to save or protect the raisins from their parasitic foes or from infections or to avoid the necessity of overhauling the whole mass in stemming the remainder. After stemming by hand and after these more tenaciously attached stems are thus positively removed, as well, the raisins still retain upon their outer surfaces a considerable portion of the objectionable matters that have adhered or been attached at or near the point of attachment of the stem where more or less saccharine matter has exuded in the process of drying and curing and furnishes a tempting nidus or food-supply for germ and insect life. The further tumbling of the thus-stemmed raisins along with the others finally removes or dislocates all objectionable matters from that part of such raisins as well, as it could not do before the removal of the pedicel-stem or while the stem was in position, since the stem end of the raisin being now exposed rubbing and tumbling contact can be made directly with and upon that part of the raisin in an effectual manner. So long as the pedicel-stems of any material number of raisins remain attached they furnish a mechanical obstacle to the removal of the objectionable matters and retain enough of them to affect the whole mass later on.

Narrow or elongated meshes extending around the tumbler would permit many stems to escape the gripping action of the grippers by being pressed back into the tumbler. I therefore prefer square meshes of suitable size. The length of time during which these raisins are to be thus treated in order to secure the desired results depends upon the original condition of the raisins, their age, the quantity submitted for action, and the tenacity of the hold of the stems. The stems are removed during the tumbling in at least three ways—first, as tumbled in mass; second, as caught in the meshes, and, third, as projecting through the meshes and caught by the scrapers. When taken from the machine, the raisins will be found brightened in appearance, relieved of all dirt and insect eggs, germs, and largely of all forms of life which have been previously deposited thereon, as well as of all stems, and also slightly changed in form by becoming more round or natural in shape, as well as in the condition of the pulp, both preparatory to seeding and preserving. The operation is especially intended to remove germs that may set up fermentation or other injurious processes, and therefore in this especial way leaves the raisins in a condition to be preserved for a much longer time than the natural raisin.

After the tumbling process is finished the mass of stemmed raisins may be subjected in any usual way to a blast or blasts of air, by which still more of the finer and lighter dust, &c., may be removed.

The process to which the raisins have been thus submitted is therefore a preliminary process particularly adapted to the process of seeding by rolling and preserving, if desired or so intended, and less washing or moistening or cleaning or rolling, pressing, and rubbing in a subsequent operation is required to seed the raisins properly. The effects of the tumbling vary more or less with the original condition of the raisins, their softness, among other things, whether natural or artificial, that is given to them by a prior moistening. The operation is therefore a partial treatment, as for stemming, disinfecting, and cleaning, and also for the subsequent treatment after moistening, or without moistening, preparatory to the complete or final seeding operation. Being thus changed in form from that in which they are usually found in their marketed condition—that is to say, more rounded—they will roll all the more easily and be seeded all the more readily when placed in the raisin-seeding machine, for which an application is about to be made by Ellicott D. Averell coincidently herewith. The pulp within the raisin-skin will also be found in a more pliable state, due to moderate rolling, pressing, striking, and rubbing during the operation, and the displacement of the seeds will in many instances be found to have been commenced or initiated. The eggs of insects, germs, &c., deposited during the growth of the raisin-grape or later will be found removed or destroyed, and being thus removed by the operation the raisin will be protected from the subsequent ravages of the worms and other forms of life that coming therefrom would have fed upon and destroyed the same if kept over to the proper season for their development.

The operation described prevents the tearing of many of the raisins by the bending and breaking off of the stems instead of the pulling of them out, as when stemming is done by hand, and it also prevents the soiling and infecting of the raisins, as when the fingers and especially the thumb and finger nails are used for the purpose.

Instead of wire-cloth wires may be stretched around or across the tumbler, or sheet metal may be perforated in such a way as to operate like wire-cloth, or some other foraminous material may be used for the peripheral surface of the tumbler, all so as to operate in the same way in stemming and other operations upon the raisins, as set forth.

I am aware that machines have been made for stemming raisins in which inner and outer cones consisting of wire-cloth have been employed; but these machines are, so far as I know, used for the purpose of removing the bunch-stems or the raisins from the bunch, are not adapted to or capable of removing the individual pedicels from the individual raisins, and therefore perform an entirely different office or function from that of my invention. It has been heretofore customary to remove these bunch-stems from all except choice table-raisins, leaving the pedicel-stems still in place on the separate raisins, apparently because no effective method or machinery for removing them has been known. Such method and machinery it is the object of my invention to show. I am also aware that it has been a common practice to tumble raisins and other dried fruits in barrels for the purpose of brightening and cleaning the same after they have become old, dull in appearance, and wormy. I am also aware that tumblers have been made and provided with wire-cloth and other kinds of open, foraminous, or perforated surface and that they have been used for brightening or cleaning cotton-seed, coffee, and dried fruit and for stripping or separating peanuts from their vines, and for other purposes; but none of these devices are capable of performing the functions and accomplishing the first three practical objects of this invention set forth in the first part of this specification, although they may accomplish the fifth and sixth objects mentioned, after a fashion, and although they might incidentally and unintentionally perform the fourth practical object they have never, so far as I know, been recognized as capable of preparing the raisins for seeding by a rolling process through an approximate restoration to the original rounded form of the fruit; nor are such devices made and used for or capable of or adapted to accomplish the general practical purposes and objects of this invention—to remove the pedicels, disinfect, protect, and preserve raisins from the unhygienic consequences and conditions to which they are normally subject, while this invention has these capabilities and adaptations in relation to all raisins, whether without seeds, as the "Sultanas," with seeds, as the ordinary raisins, or without seeds, the seeds having been removed by any known process or processes; and it has them as a means and a part of the preparation of raisins of superior class and condition for the market by the grower and producer in the first instance.

It is an essential feature of this invention that the scraper, gripper, or nipper be located adjacent to the under side of the tumbler and beneath the mass of the fruit there located and not at or near the top of the revolving tumbler. Of course there is a limit to the quantity or size of each charge of raisins to be operated upon. If the tumbler should be filled, little tumbling would occur. For effective work, therefore, the nippers should be located below the center of the tumbler and opposite a sufficient mass of the raisins composing each charge, and preferably only sufficient to permit the rolling displacement of the raisins while tumbling and rubbing over each other, and eventually the presentation of all the pedicel-stems through the meshes and within reach of the grippers. The grippers or scrapers, however, furnish only one of the three coöperating means and methods employed in my invention for removing the pedicel-stems from the raisins.

The stems most lightly attached to the raisins are most easily displaced, and that during the rolling and tumbling of the mass of raisins by the contact of the stems with other raisins moving in mass or by the moving of the body of the raisins in mass while the stem is held. Still other stems are removed by becoming caught in the meshes of the tumbler's circumference while their raisins are being rolled or bent over in the rolling sliding mass of raisins in such a way as to displace or break off the stems by a leverage action. The most difficult part of the stemming, however, consists in securing a grip upon the stems most tenaciously held to the raisins, and that in such a way as to insure their removal, as if gripped between the thumb and finger and pulled out and away from the raisin. This is effectually done by the grippers or scrapers in combination with the sides of the mesh or hole, however strongly attached the stems may be. So tenacious is the hold of the grippers that in many instances the stems are flipped or thrown to some distance from the tumbler on being released from the raisins, and any loose stems that may be branched or otherwise too large to pass through the meshes and pass out of the tumbler may be caught where even slightly projecting beyond the surface of the tumbler and energetically pulled through the mesh by the grippers, and as the rolling of the tumbler constantly tends to displace the contents and change the location of both stems and raisins, including the loose stems, all of the stems will sooner or later be caught and removed from or from among the raisins and from the tumbler. The smaller and lighter stems will eventually drop through the meshes by their own weight, and in that way become separated from the raisins; but where the stemming is done by the grippers the stems are not only removed each from its own raisin, but they are separated from all the other raisins at the same time and by the same means, and when rubber is used for the acting part of the nipper its elasticity is useful not only in making and securing a grip on the stem, but also in flipping it away.

In many cases the grippers are aided in removing the stems by the movement of the raisin with and by the mass of raisins of which it is a part while the stem is practically stationary, such movement of the raisin tending to flex or bend the raisin off from the stem while held by the gripper.

I claim as my invention—

1. A revolving tumbler for removing pedicel-stems from raisins, provided with a meshed, perforated or foraminated circumference, the meshes being of a suitable size to receive, detain and remove pedicel-stems in the act of tumbling, and also provided with one or more grippers in suitable relations to the outer surface of the under half of the tumbler to engage and remove pedicel-stems from raisins.

2. In combination, for stemming and cleaning fruit, a tumbler provided with a surface having openings of a suitable size to receive the pedicel-stems of the fruit and one or more grippers located in such relations to the outer surface of the under half of the tumbler as to engage the projecting ends of the pedicel-stems against the edges of the openings and cause their separation from the fruit.

3. A revolving barrel or tumbler D provided with a peripheral surface consisting of No. 4 to 4½ wire-cloth, in combination with grippers R R located adjacent to the periphery of the revolving tumbler on the lower half of its circumference.

4. A revolving tumbler for stemming, cleaning, disinfecting and polishing raisins, provided with an open or perforated circumference, in combination with one or more outside grippers with which the perforated circumference makes approximate contact.

5. A berry-stemming machine, comprising a frame, a rotary cylinder mounted in said frame and having an opening for the introduction and removal of the berries, a closure for the said opening, the said cylinder having openings for the passage of the berry-stems only, and a blade extending across the outer face of the cylinder to engage the projecting stems, substantially as described.

HERMANN L. SANBORN.

Witnesses:
JAMES A. SKILTON,
EDWARD S. BERRALL.